United States Patent [19]

Callsen et al.

[11] Patent Number: 5,884,022
[45] Date of Patent: Mar. 16, 1999

[54] METHOD AND APPARATUS FOR CONTROLLING SERVER ACTIVATION IN A MULTI-THREADED ENVIRONMENT

[75] Inventors: Christian J. Callsen, Menlo Park; Ken M. Cavanaugh, Montara, both of Calif.

[73] Assignee: Sun Microsystems, Inc., Palo Alto, Calif.

[21] Appl. No.: 660,086

[22] Filed: Jun. 3, 1996

[51] Int. Cl.[6] ................................................. G06F 11/00
[52] U.S. Cl. .............................. 395/182.22; 395/182.21; 395/185.08
[58] Field of Search ........................ 395/185.08, 200.19, 395/726, 651, 652, 672, 670, 182.08, 182.11, 182.21, 182.22, 182.09, 182.02, 182.1, 750.01, 750.07

[56] References Cited

U.S. PATENT DOCUMENTS

| | | | |
|---|---|---|---|
| 4,713,750 | 12/1987 | Hoflich et al. | 364/900 |
| 4,967,347 | 10/1990 | Smith et al. | 364/200 |
| 5,315,161 | 5/1994 | Robinson et al. | 395/182.22 |
| 5,345,550 | 9/1994 | Bloomfield | 395/156 |
| 5,347,627 | 9/1994 | Hoffmann et al. | 395/157 |
| 5,367,697 | 11/1994 | Barlow et al. | 395/800 |
| 5,414,806 | 5/1995 | Richards | 395/135 |
| 5,423,034 | 6/1995 | Cohen-Levy et al. | 395/600 |
| 5,436,637 | 7/1995 | Gayraud et al. | 345/116 |
| 5,461,710 | 10/1995 | Bloomfield et al. | 395/161 |
| 5,491,784 | 2/1996 | Douglas et al. | 395/159 |
| 5,493,638 | 2/1996 | Hooper et al. | 395/135 |
| 5,544,288 | 8/1996 | Morgan et al. | 395/157 |
| 5,548,702 | 8/1996 | Li et al. | 395/155 |
| 5,550,968 | 8/1996 | Miller et al. | 395/157 |
| 5,559,942 | 9/1996 | Gough et al. | 395/155 |
| 5,566,330 | 10/1996 | Sheffield | 395/600 |
| 5,570,462 | 10/1996 | McFarland | 395/136 |
| 5,576,945 | 11/1996 | McCline et al. | 364/131 |
| 5,596,711 | 1/1997 | Bruckhardtt et al. | 395/182.21 |
| 5,621,734 | 4/1997 | Mann et al. | 395/200.12 |
| 5,627,962 | 5/1997 | Goodrum et al. | 395/182.11 |
| 5,630,142 | 5/1997 | Crump et al. | 395/182.22 |
| 5,640,585 | 6/1997 | Smoot, III et al. | 395/800 |
| 5,694,603 | 12/1997 | Reiffin | 395/677 |
| 5,694,604 | 12/1997 | Reiffin | 395/677 |

OTHER PUBLICATIONS

"Dynamic Object Temporary Stop/Disappearance Notification/Permission." IBM Technical Disclosure Bulletin, vol. 38, No. 12, Dec. 1, 1995, p. 413/414.

"Distributed Object Activation and Communication Protocols." IBM Technical Disclosure Bulletin, vol. 37, No. 7, Jul. 1, 1994, pp. 539–542, XP002009565.

"SOMobjects Developer Tookit User Guide, Version 2.1." Oct. 24, 1994, IBM, US XP002042219, pp. 6–32, 6–34, 6–35, and 6–59.

Ronald L. Johnston, "The Dynamic Incremental Compiler of APL/3000," APL79 Conference Proceedings, Association for Computing Machinery, Rochester, New York, U.S.A. 30 May–1 Jun. 1979, pp. 82–87.

Leo J. Guibas and Douglas K. Wyatt, "Compilation and Delayed Evaluation in APL," Fifth Annual Symposium on Principles in Programming Languages, Tucson, Arizona Jan. 23–25, 1978, pp. 3–6.

Glenn Krasner, "The Smalltalk–80 Virtual Machine," BYTE Publications, Inc., Aug. 1991, p. 300–320.

*Primary Examiner*—Joseph E. Palys
*Attorney, Agent, or Firm*—Hecker & Harriman

[57] ABSTRACT

A method and apparatus for controlling server activation. In the prior art, there exists a race condition between the shutting down of an old server and the starting up of a new server. Further, rapidly restarting servers, such as daemonic servers, are prone to thrashing behavior. However, an embodiment of the invention avoids this undesired behavior by providing an additional "shutting down" state in the server finite state machine running in the ORB daemon. This additional state allows an old server to complete the necessary shut down procedures prior to the startup of a new server. Also, a process is provided for handling servers that are too slow to shut down or start up. A second additional state is provided in the server finite state machine to handle self started servers.

39 Claims, 10 Drawing Sheets

METHOD AND APPARATUS FOR CONTROLLING SERVER ACTIVATION IN A MULTI-THREADED ENVIRONMENT

BACKGROUND OF THE INVENTION

1. Field of the Invention

This invention relates to the field of multi-threaded, object-oriented computer environments.

2. Background

In multi-threaded, object-oriented computer environments of the prior art, problems arise when, as an object server is shutting down, a new object server is being started as a response to an invocation by a client. The daemon process responsible for starting a new server assumes that the old server shuts down instantaneously. In actuality certain cleanup processes, such as the release of database locks, may still be in progress when a new object server is started. These cleanup processes can cause the new object server to abort startup. Thus, an undesired race condition exists between the shutdown of old object servers and the startup of new object servers.

Networked Object Environment

In the networked object environment, an object server, also referred to as a server process, is a multi-threaded process that controls access to, instantiation of, and deletion of, the methods, data, etc., embodied in the objects within its domain. Objects are self-contained, dearly defined, software modules that encapsulate procedures, such as business practices, and their data. Communicating with each other through carefully defined interfaces, objects allow complex solutions to be constructed similar to the manner in which computers are manufactured from standardized electronic components. Multiple levels of re-use and standardization are made possible, enabling engineers to produce modules, applications, and entire systems that are highly reusable and leveragable.

Networked object technology allows applications access to objects and their shared services anywhere in the network, substantially independent of where the application or object resides. Networked objects also permit individual objects to be updated without the risk of disrupting the application or business process it models, facilitating the graceful, incremental evolution of complex systems. For example, if a new component fails, the component's predecessor can be re-instated quickly and transparently.

An example of the networked object environment is the CORBA-compliant NEO product family from SunSoft™, which provides for sharing of objects across networks and differing computing platforms.

Consisting of over 600 software vendors, developers, and end user organizations, the Object Management Group (OMG) has developed and continues to develop standards for a common architecture supporting heterogeneous, distributed, object-oriented applications. The OMG Common Object Request Broker Architecture (CORBA) is designed to allow different object systems from multiple vendors to interact with each other on a network. The CORBA specification comprises the following four components:

i) An Object Request Broker (ORB) to manage objects in a networked environment;

ii) Interoperability for ORB-to-ORB communications;

iii) Common Object Services (CORBAservices); and iv) Mappings for commonly used programming languages.

The Network Object Request Broker (ORB) is a CORBA-compliant network-based software system providing for the location and execution of objects through a standard interface protocol, enabling objects and programs to interact with each other across the network. The NEO ORB is implemented as one or more multi-threaded UNIX processes, providing scalable performance and availability as needed.

To promote heterogeneous object interoperability, the OMG has provided a portable source code reference implementation of the CORBA 2.0 Internet Inter-ORB Protocol to assist software vendors in testing and delivering OMG-compliant products. The Internet Inter-ORB Protocol (Internet IOP) provides a standardized way of connecting ORBs from different CORBA 2.0 compliant vendors, enabling them to communicate with each other. The current Internet IOP is based on TCP/IP protocols.

The OMG CORBAservices definition describes the basic operations required for building distributed systems with objects, such as naming, events, properties, lifecycle and relationship services.

For different object systems to interact, language independence is a concern. The Interface Definition Language (IDL) enables the separation of interface and implementation, allowing object implementation details to change without compromising the plug-and-play qualities of the object. The OMG IDL is a neutral interface definition of an object's operations, allowing the behavior of the object to be defined in IDL, but accommodating the automated transformation of the interface to the C, C++, Objective C, or Smalltalk languages.

A multi-threaded environment, such as that provided by UNIX, is typically used for supporting networked objects. Threads are subprocesses spawned off of larger processes for performing a certain function, e.g. performing a printing process, acting on a database object, etc. By supporting multiple threads, the system can serve many clients and processes simultaneously. This enables the sharing of objects and services on the network.

In the CORBA environment, an Object Request Broker Daemon process (ORBD) receives object requests, also referred to as method invocations, from the client processes registered to it. The ORB daemon then locates the object on the network, and acts as the interface between the client process and the networked object. In the NEO environment, the ORB daemon may activate a NEO object server to act as a further interface for the object which may be a standard NEO object or, in some instances, a legacy process encapsulated in a NEO shell to perform as a NEO object. The NEO object server acts to instantiate the object as is necessary to respond to the requests forwarded by the ORB daemon.

System Block Diagram

FIG. 1 is a block diagram of a CORBA-compliant networked object system. Multiple threads are represented by elements 100–103, where threads 100–101 are threads spawned from a first client process, Client Process 1, and threads 102–103 are threads spawned from a second client process, Client Process N. As indicated in FIG. 1, a single client process can spawn any number of threads. Each of threads 100–103 is linked to Object Request Broker Daemon (ORBD) process 104. ORBD process 104 is in turn linked to a plurality of object servers represented by object server 105 and object server 107. A second ORBD process, ORBD process 110, is further linked to ORBD process 104. ORBD process 110 could also be coupled to further object servers and/or client processes (not shown). Object server 105 is linked to object 106. Object server 107 is linked to objects 108 and 109.

ORBD process 104 receives object requests, such as method invocations in the form of locate requests, from client process threads 100–103, and determines which object server is supporting the appropriate object. If the necessary server is not currently running, the server is activated and the object is instantiated. Information on the location of the object is returned in response to the locate request, and further requests between the thread and the object are directed by the location information. The same object can be similarly invoked by locate requests from other threads to establish interaction between the object and all applicable threads concurrently.

ORB daemon 110 may provide a gateway for the networked object environment over a large network such as the Internet and/or it may provide cross-platform interaction by providing a platform dependent interface to clients and object servers in its own domain, while providing a standardized interface to ORBD 104.

Object servers 105 and 107 provide access to objects or object libraries, such as shown by objects 106 and 108–109. Legacy objects, that is those objects comprising stand-alone applications and other objects not originally designed for the networked object environment, are provided with an IDL shell that forms an interface through which the object server can access the functions of the legacy object. A Persistent Store Manager process running in tandem with the ORB daemon keeps track of locks the object server may have on objects, e.g., database objects, to maintain server-exclusive access.

As the network is substantially independent of hardware boundaries, the objects and object servers may reside on the same computer as the client processes and the ORB daemon, or they may reside on separate computers within the network. Similarly, the networked object environment is substantially independent of the base level implementation of the network.

Shutdown Protocol

A prior art implementation of the shutdown protocol for object servers is as follows. An object server decides to shut down, for instance, due to idle time or possibly in response to a client's invocation. The object server then begins to shut down all active objects, waiting for all method invocations to finish. When all of the objects associated with the object server are shut down, the object server sets its server state to "in shutdown," and signals to the ORB daemon that it is shutting down. When the ORB daemon is successfully notified that the object server is shutting down, the server sets its server state to "finished," and terminates the connection to the ORB daemon. Finally, the object server signals the main thread that shutdown is complete, and the main thread proceeds to perform the last cleanup, such as releasing any locks the object server might have into the Persistent Store Manager.

The object server finite state machine running in the object server is illustrated in the state diagram of FIG. 2. The server state machine consists of four states: "not running," "running," "in shutdown," and "finished." When the server starts, the server is in state 200, "not running," and any invocations of methods are made to wait, as indicated by arrow 204. Once the object server has registered with the ORB daemon and a run indication is received by the object server, as shown by arrow 205, the object methods are enabled and the server state advances to state 201, "running."

While in state 201, new invocations increment the active methods counter, as shown by arrow 206, and ending method invocations decrement the active methods counter, as shown by arrow 207. When the object server is to be shut down due to excessive idle time, an invocation from a client, etc., the object server waits till all method invocations clear, as shown by arrow 208, then signals the ORB daemon that it is shutting down, forces new invocations from clients to wait, and sets its server state to state 202, "in shutdown."

As shown by arrow 209, further invocations during state 202 are forced to wait. After the ORB daemon has been successfully notified that the server is shutting down, then, as shown by arrow 210, the object server returns an error to all waiting clients and forces clients to rebind, i.e., to locate a new object server. The server state is then advanced to state 203, "finished," wherein the last cleanup operations, such as removal of locks, are performed.

A second server finite state machine operates inside the ORB daemon, and determines the activation/deactivation control exhibited upon the server by the ORB daemon. This second finite state machine has three states: "start," "starting," and "running." A state diagram of this three-state finite state machine is shown in FIG. 3. When a locate request targeting a server in "start" state 300 arrives at the ORB daemon, as indicated by arrow 303, the server is forked off as a new process, the requesting method invocation is blocked, and the server state enters "starting" state 301.

While in state 301, all locate requests are blocked and forced to wait for registration of the server, as shown by arrow 305. If the server PID (process ID) dies, as represented by arrow 304, then any waiting method invocations are unblocked and the server returns to "start" state 300, where a waiting method invocation will retry to start the server. If, while in "starting" state 301, the server registers with the ORB daemon, as shown by arrow 306, all waiting method invocations are unblocked and the server state enters "running" state 302.

As indicated by arrow 307, all subsequent locate requests received while in "running" state 302 return the address information that the server provided as part of its registration. As shown by arrow 308, when the server signals, as part of its shutdown protocol, that it is shutting down, the ORB daemon cleans up and the server state returns to "start" state 300.

The primary problem with the server activation/deactivation protocol of FIGS. 2 and 3 is that race conditions occur while shutting a server down. Shutdown procedures, such as the removal of locks, occur in the server after the server has signaled to the ORB daemon that it has shut down. However, the ORB daemon operates as if the server has completely shut down at the time the shutdown signal is received from the server. This implies to the ORB daemon that a new server can start immediately as a result of a locate request.

The conflict arises when a new server tries to access resources that are still locked to the old server. If the old server has not yet removed the locks, the new server is denied access to the locked resources, and the new server aborts startup. A race condition thus exists between the release of all locks on resources held by the old server and the accessing of those same resources by the new server. If the locks are released first, then, barring any other problems, the new server will complete startup successfully. If the new server tries to access the resources first, then the new server will be aborted. Forking off a new server process, only to have the new server process abort in the midst of startup, is a waste of CPU processing time that is better spent on other processes, such as the shutdown of the old server.

The problem lies in the server finite state machine within the ORB daemon (i.e., FIG. 3). This state machine does not account for the shutdown process (i.e., during the time when a server is moving from "running" state 307 to "start" state 300). It is legal to immediately start a new server even though the "shutting down" server may not have fully shut down. This causes the race condition between the old server shutting down and the new server starting up.

The existing protocol also does not handle servers that start without registering or take too long to register, and servers that shut down too slowly. If a server is too slow to register with the ORB daemon, e.g., because the server is hanging, then action should be taken. Similarly, if a server is too slow to shut down, e.g., because the server is hanging, then action should be taken to allow startup of a new server. Currently, no mechanism exists for handling these problems.

Further, there is currently no mechanism for handling a thrashing condition. A thrashing condition occurs when a server undergoes a series of aborted startups and restarts. This can happen when a server attempts to restart too rapidly. For instance, daemonic servers, which are restarted automatically by the ORB daemon whenever they exit, can be seriously impaired by thrashing behavior. Thrashing may also indicate an unrecoverable error in the startup process of the server. If there is no mechanism for handling a thrashing condition, this problem cannot be prevented from occurring repeatedly in the future.

Finally, the ORB daemon is not currently equipped to handle "self started servers" (also called "user servers") in the state machine. Self started servers are servers that just register and deregister themselves with the ORB daemon, but are not spawned by the ORB daemon as a result of an invocation.

SUMMARY OF THE INVENTION

A method and apparatus for controlling server activation is provided. A server state in a server state machine is associated with a server process. The server state is changed from a running state to a shutting down state when a shutdown indication is received from the server process. While in the shutting down state, method invocations directed at the server process are blocked, thus preventing the activation of a new server process during this state. The server state is changed from the shutting down state to a start state when an indication is received that shutdown of the server process is complete.

To handle hanging server processes, a timer is started when a server state changes from the start state to a starting state, or from the running state to the shutting down state. If the timer expires before registration or termination of the server, the server process is killed and an error is logged. When the server process dies, the server state returns to the start state.

In one embodiment, a self started running state is included in the server state machine to accommodate self started server processes. A server state associated with a self started server process is changed from the start state to the self started running state when the self started server process registers. The server state returns to the start state when the self started server process deregisters. Locate requests targeted to the self started server process are returned server address information during the self started running state.

In a further embodiment, a separate holddown state machine is provided to handle thrashing server processes. A holddown state is associated with a server process, and any locate requests targeted at the server query the holddown state machine for a response. After querying the holddown state machine, the locate requests query the server state machine.

DETAILED DESCRIPTION OF THE INVENTION

Figure 1:
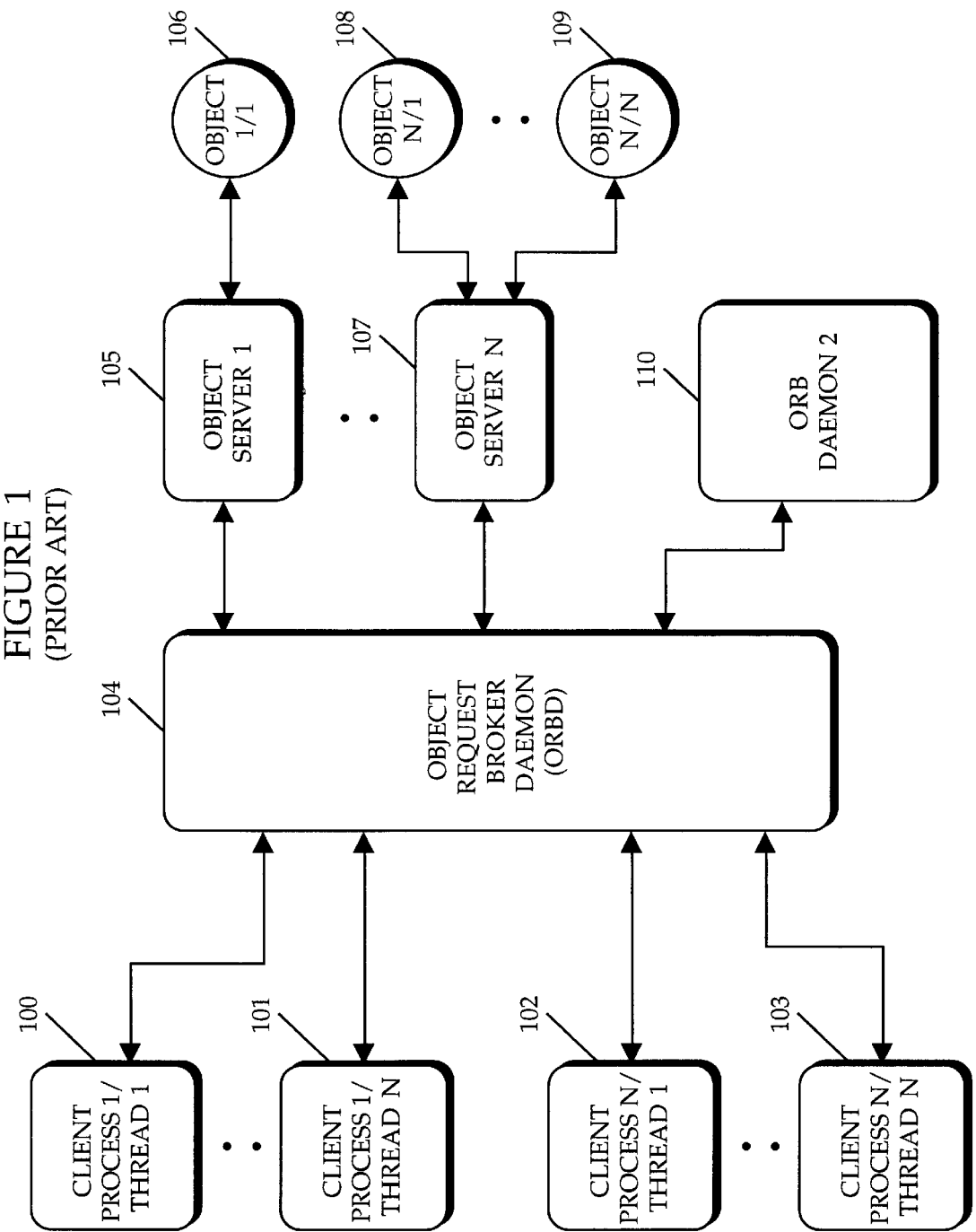
FIG. 1 is a block diagram of an example of a networked object environment.
Figure 2:
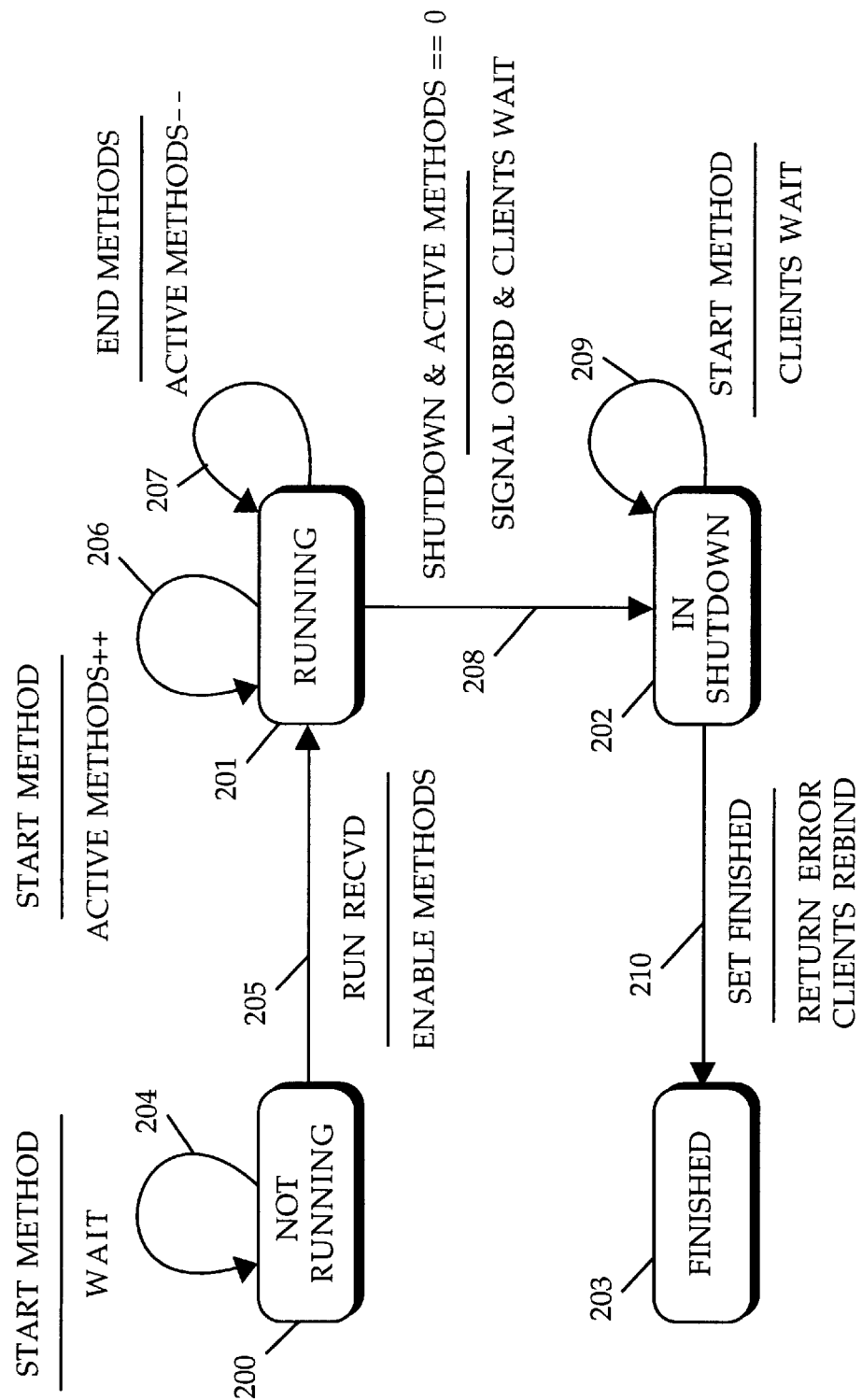
FIG. 2 is a state diagram of a server finite state machine process running in an object server.
Figure 3:
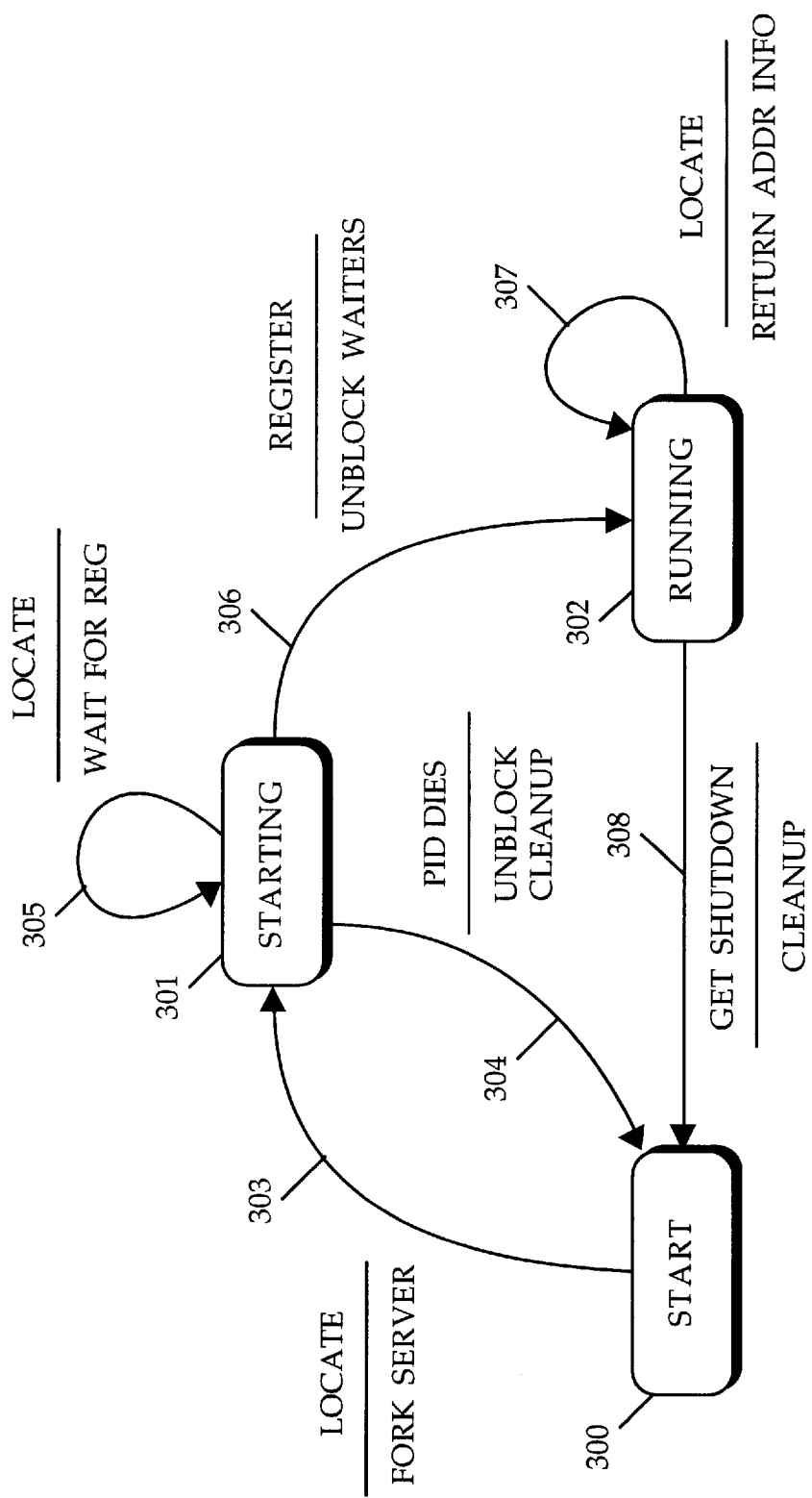
FIG. 3 is a state diagram of a server finite state machine process running in an ORB daemon.

A method for controlling server activation is described. In the following description, numerous specific details are set forth in detail to provide a more thorough description of the invention. It will be apparent, however, to one skilled in the art, that this invention can be practiced without these specific details. In other instances, well known features have not been described in detail so as not to unnecessarily obscure the invention.

An embodiment of the invention provides a method and apparatus for controlling server activation. In the prior art, there exists a race condition between the shutting down of an old server and the starting up of a new server. However, this embodiment of the invention avoids this undesired condition by providing an additional "shutting down" state in the server finite state machine running in the ORB daemon. This additional state allows an old server to complete the necessary shut down procedures prior to the startup of a new server. Also, a process is provided for handling servers that are too slow to shut down or start up, and a second additional state is provided in the server finite state machine to handle self started servers. Thrashing servers are handled by a separate holddown state machine.

In one embodiment of the invention, a server state machine operating in the ORB daemon comprises five states: a "start" state, a "starting" state, a "running" state, a "shutting down" state, and a "self started running" state. On startup, a new server proceeds from the "start" state to the "starting" state, wherein the server remains until it registers with the ORB daemon, at which time the server enters the "running" state. A server that takes too long to start up will timeout in the "starting" state and return to the "start" state where a waiting client will try to restart the server. When an old server shuts down, the server enters the "shutting down" state from the "running" state, and performs the necessary cleanup operations. When the server dies, the server returns to the "start" state, and a new server may start up. A server process that takes too long to terminate is "killed" by the ORB daemon and returned to the "start" state. Any invocations received while the server is in the "shutting down" state are blocked.

The "self started running" state is implemented to handle self started or user servers that merely register and deregister with the ORB daemon. When the self started server registers with the ORB daemon, the server's state is advanced from the "start" state to the "self started running" state. Invocations received while the server is in the "self started running" state return address information for the server. When the self started server deregisters from the ORB daemon, the server state returns to the "start" state, and the ORB daemon assumes the server is shut down.

A separate state machine is implemented in a further embodiment of the invention to control holddown of a server in the instance where the server is thrashing. Thus, unrecoverable errors in server startup processes are handled.

Figure 4:
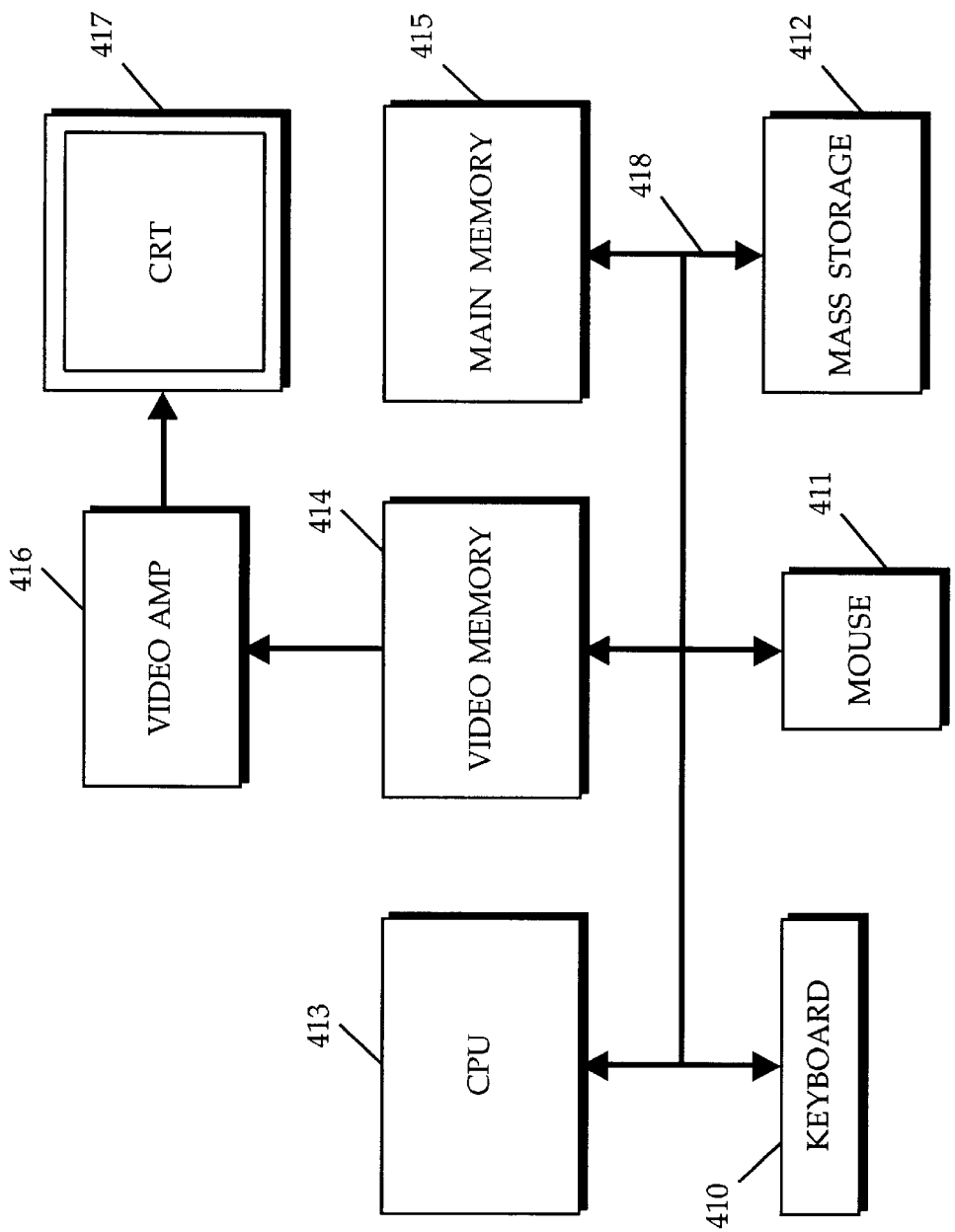
FIG. 4 is a block diagram of a computer system suitable for supporting a networked object environment.

An embodiment of the invention can be implemented as computer software in the form of computer readable program code executed on a general purpose computer such as illustrated in FIG. 4. A keyboard 410 and mouse 411 are coupled to a bi-directional system bus 418. The keyboard and mouse are for introducing user input to the computer system and communicating that user input to central processing unit (CPU) 413. The computer system of FIG. 4 also includes a video memory 414, main memory 415 and mass storage 412, all coupled to bi-directional system bus 418 along with keyboard 410, mouse 411 and CPU 413. The mass storage 412 may include both fixed and removable media, such as magnetic, optical or magnetic optical storage systems or any other available mass storage technology. Bus 418 may contain, for example, thirty-two address lines for addressing video memory 414 or main memory 415. The system bus 418 also includes, for example, a 32-bit data bus for transferring data between and among the components, such as CPU 413, main memory 415, video memory 414 and mass storage 412. Alternatively, multiplex data/address lines may be used instead of separate data and address lines.

In one embodiment of the invention, the CPU 413 is a 32-bit microprocessor manufactured by Motorola, such as the 680X0 processor or a microprocessor manufactured by Intel, such as the 80X86, or Pentium processor. However, any other suitable microprocessor or microcomputer may be utilized. Main memory 415 is comprised of dynamic random access memory (DRAM). Video memory 414 is a dual-ported video random access memory. One port of the video memory 414 is coupled to video amplifier 416. The video amplifier 416 is used to drive the cathode ray tube (CRT) raster monitor 417. Video amplifier 416 is well known in the art and may be implemented by any suitable apparatus. This circuitry converts pixel data stored in video memory 414 to a raster signal suitable for use by monitor 417. Monitor 417 is a type of monitor suitable for displaying graphic images.

In a network environment, the apparatus of FIG. 4 is coupled to other similar apparatus using suitable communications hardware and software as is known in the art. Front ends systems for accessing the shared services of the network may comprise PC systems running Windows™, web browsers supporting the Java™ application interface, workstations running Solaris™, or other suitable systems, including combinations thereof.

The computer systems described above are for purposes of example only. An embodiment of the invention may be implemented in any type of computer system or programming or processing environment. Also, client-server systems in multi-threaded environments other than the NEO environment previously described may implement the method and apparatus of the invention using a server control process similar to the ORB daemon to implement an embodiment of the server finite state machine.

In the prior art, activation or startup of a new server in a multithreaded environment can be impaired by the operations of an old server that is shutting down. Database locks and other server specific functions may still be active for an old server, thus causing the activation of a new server to be abnormally terminated, or aborted.

An embodiment of the invention avoids the problems of the prior art by preventing a new server from starting up before an old server has completed its shutdown processes. This is done by providing an additional "shutting down" state in the ORB daemon to indicate that the old server is in the process of shutting down. After the old server is finished shutting down and the server state has left the "shutting down" state, the new server may be activated. Thus, a race condition is avoided.

Multi-threaded environments of the prior art are also prone to "hanging" servers, i.e., servers that take too long to shut down or start up due to a problem in the server process. An embodiment of the invention avoids this problem by establishing timers for the startup and shutdown process. If a server has a timeout, i.e., the timer has gone beyond a preset limit, then the server is returned to its "start" state and an error is logged.

In prior art systems, certain server processes restart too rapidly, dying before the server has completed startup and restarting in a cycle referred to as thrashing. This can be caused by unrecoverable errors in the startup process of the server. Thrashing behavior is handled in one embodiment of the invention with the addition of a server holddown state machine.

Finally, in the prior art, self started servers are not anticipated by the state machine in the ORB daemon. An embodiment of the invention includes an additional running state for self started servers. Self started servers are placed in a "self started running" state when they register with the ORB daemon, then they are placed in the "start" state when they deregister. Self started servers are considered by the ORB daemon to be shut down when they enter the "start" state.

A finite state machine in an embodiment of the invention may be implemented with a software process in the ORB daemon including a state variable containing a representation of the current state of the server. In responding to specified inputs, the state machine process determines the current state from the state variable and the appropriate action for that state. The contents of the state variable may be a simple binary value representation of the current state such as "000" for "start," "001" for "starting," "010" for "running," "011" for "shutting down", and "100" for "self started running," or any other suitable state representation. Multiple servers can be handled by an ORB daemon using a state table containing a state variable for each server. The state machines may also be implemented with branching software code modules, having a separate module for each state. In such an implementation, the state of the server need not be explicitly represented. Standard timer functions known in the art may be used for implementing "timeout" procedures.

The typical server lifecycle is as follows. The first locate request to a server starts the server, waits for the server to register with the ORB daemon, and then returns the server location or address information to the client. When a server decides to shut down, the server proceeds with the deactivation of its objects, and then signals the ORB daemon that it is going to shut down. At this point, the ORB daemon blocks all locate requests to the server and considers the server in the process of shutting down. The server completes its shutdown process and releases all locks into object databases and the Persistent Store Manager. When the server process terminates, the ORB daemon is notified. After being notified of the termination, the ORB daemon considers the server completely shut down, and will permit a new server to be restarted.

Figure 5:
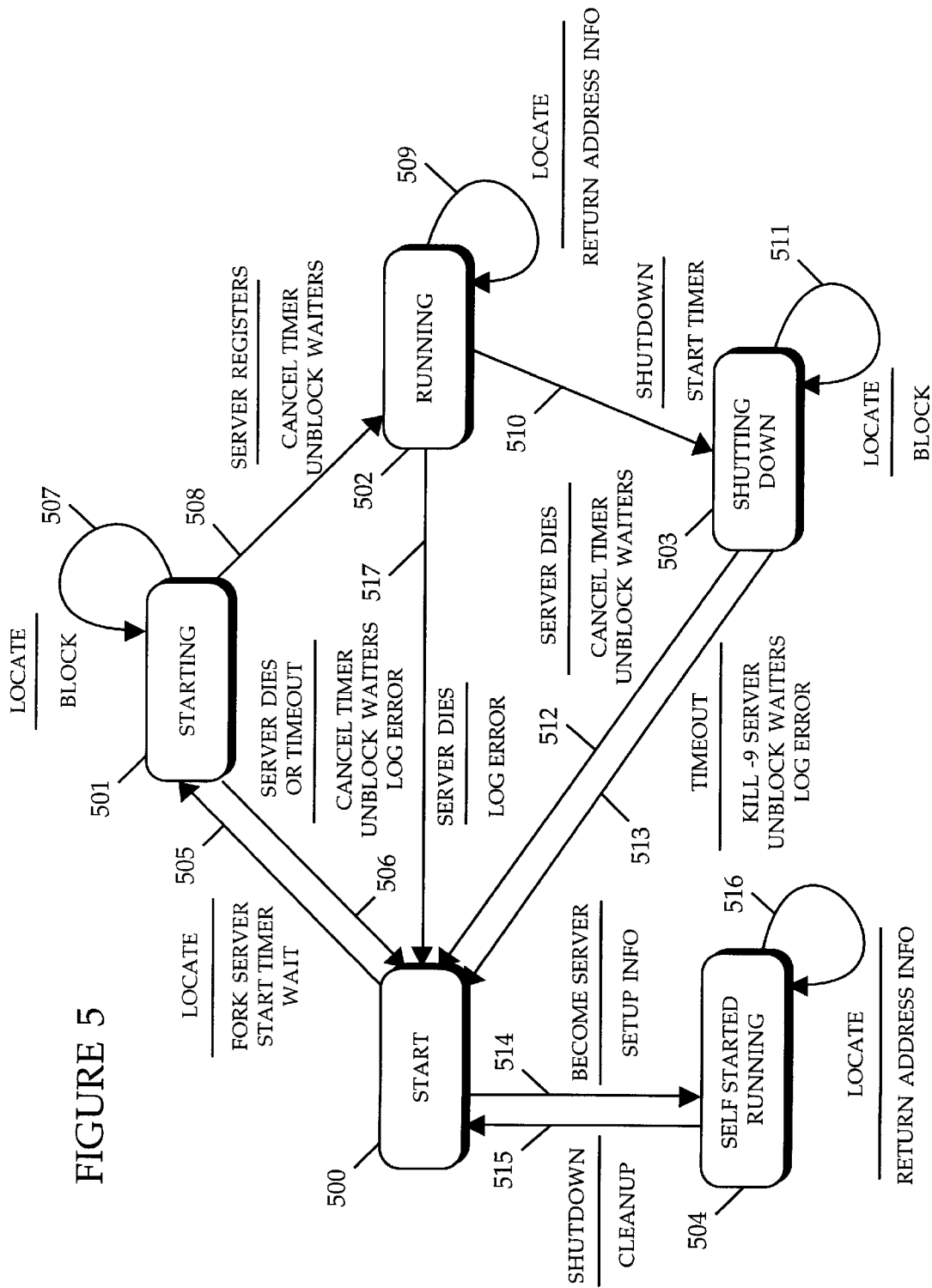
FIG. 5 is a state diagram of one embodiment of the finite state machine operating in the ORB daemon according to an embodiment of the invention.

FIG. 5 illustrates a state diagram for one embodiment of the invention. The finite state machine represented in FIG. 5 is implemented in the ORB daemon or other similar server monitoring and controlling process.

In FIG. 5, an unactivated server exists in "start" state 500. When a locate request, or invocation, is received for the unactivated server, as indicated by arrow 505, the server process is forked off, the method invocation from the client is made to wait, and a startup timer is triggered. The server then enters "starting" state 501. As indicated by arrow 507, all method invocations received in "starting" state 501 are blocked (i.e., made to wait).

If the server process dies or the startup timer indicates a timeout condition in "starting" state 501, then, as shown by arrow 506, the startup timer is cancelled, waiting method invocations are unblocked, an appropriate error message is reported in a log file, and the server is returned to "start" state 500. An unblocked method invocation may then attempt to restart the server. If the server successfully registers with the ORB daemon from "starting" state 501, then, as indicated by arrow 508, the startup timer is cancelled, waiting method invocations are unblocked, and the server enters "running" state 502.

When a server unexpectedly dies while in "running" state 502, as shown by arrow 517, the server state returns to "start" state 500 and an error is logged. Locate requests received in "running" state 502 return address information for the server, as indicated by arrow 509. When a server decides to shut down as indicated by arrow 510, whether due to expiration of an idle timer or due to a client request, etc., the server state enters "shutting down" state 503, and a shutdown timer is triggered.

All method invocations received while in "shutting down" state 503 are blocked, as indicated by arrow 511. When the server dies, i.e., finishes shutdown procedures, the shutdown timer is cancelled, any waiting method invocations are unblocked and the server state returns to "start" state 500, as shown by arrow 512. Arrow 513 indicates a shutdown timeout condition wherein the shutdown timer has expired. If the shutdown timer expires, the ORB daemon assumes the server process is hanging and kills the server, returning the server state to "start" state 500. Any waiting method invocations are unblocked and an error is logged. Whenever the server returns to "start" state 500, any unblocked method invocations may attempt to restart the server.

When a self started server or user server registers with the ORB daemon, as indicated by arrow 514, the state of the server is placed in "self started running" state 504, and the ORB daemon and the server exchange setup information. While in "self started running" state 504, any invocations return address information for the server, as shown by arrow 516. A self started server may deregister from the ORB daemon as indicated by arrow 515, at which time the ORB daemon assumes the server is shut down, and cleanup operations are performed. Upon deregistration, the self started server is returned to "start" state 500. A shutdown request sent to a self started server results in deregistration of the server.

In one embodiment of the invention, a separate state machine is implemented to control holddown conditions. At times, it is necessary to hold down a server process either temporarily, e.g., to permit a minor conflict to be resolved, or for a longer duration, e.g., to notify an administrator of an unrecoverable error that requires correction. During a short holddown, the server is expected to be unavailable for only a short duration, therefore locate requests targeted at the server are merely blocked until the short holddown is ended. However, during a long holddown, the server is expected to be unavailable for an extended duration. Therefore, locate requests during a long holddown return an error to reflect the unavailability of the server.

Servers that restart too rapidly, i.e., more than a configurable number of times per unit of time as determined by a timed counter function, are referred to as "thrashing." When a thrashing condition is detected, the server is placed in a long holddown.

The holddown conditions are controlled in a three-state state machine having a "no holddown" state, a "short holddown" state, and a "long holddown" state. The locate request is first processed in the holddown state machine, which performs the appropriate action based on the holddown state, and is then processed by the server state machine.

Figure 6:
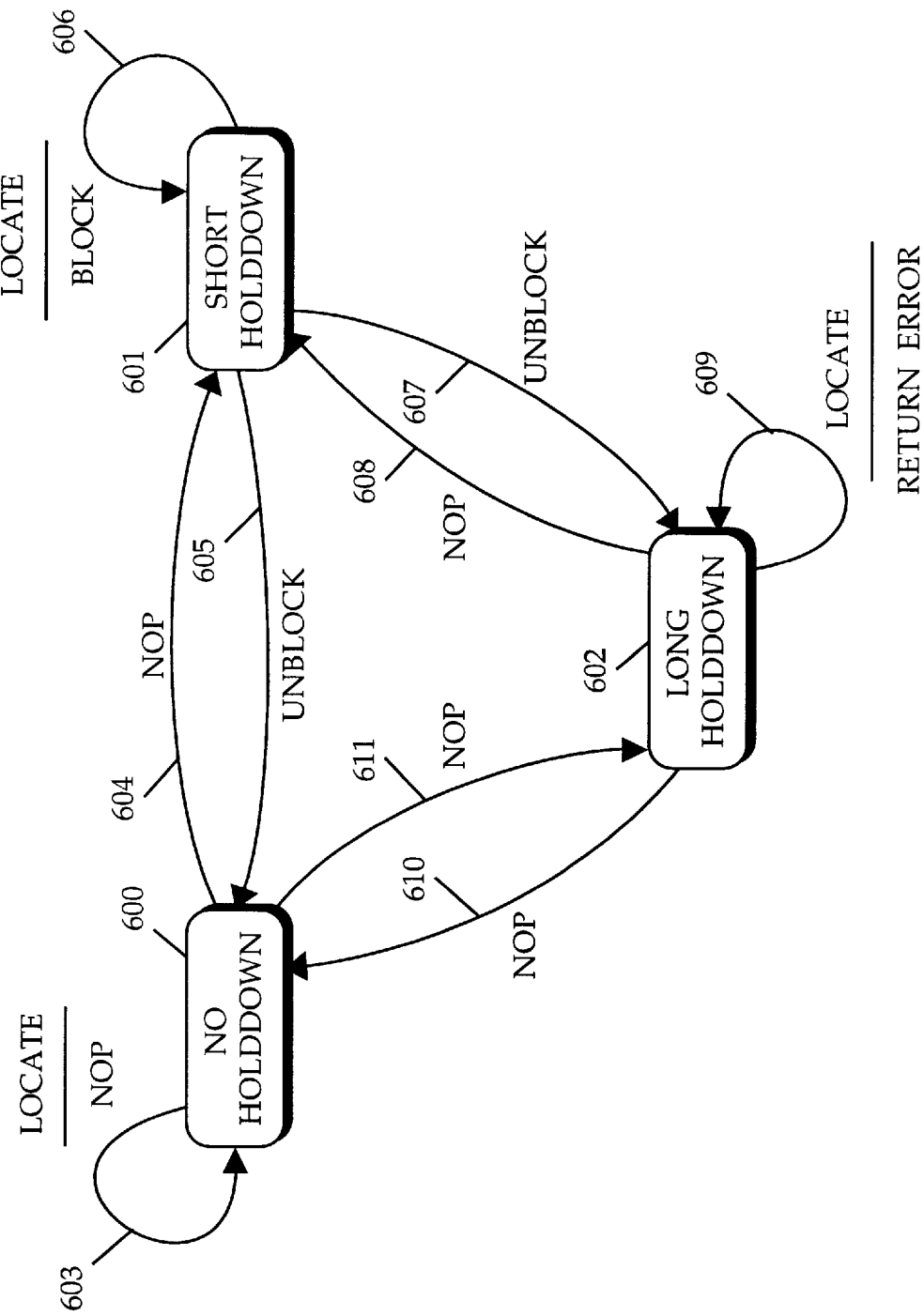
FIG. 6 is a state diagram of a hold-down state machine for one embodiment of the invention.

An embodiment of a holddown state machine is shown in FIG. 6. In FIG. 6, "no holddown" state 600 indicates that the server is not being currently held down. As indicated by arrow 603, locate requests received in "no holddown" state 600 produce no operation from the holddown state machine. Further, as indicated by arrow 609, locate requests received in "long holddown" state 602 return an error.

With respect to transitions between holddown states, transitions from "no holddown" state 600 to "short holddown" state 601, from "no holddown" state 600 to "long holddown" state 602, from "long holddown" state 602 to "no holddown" state 600, and from "long holddown" state 602 to "short holddown" state 601, represented respectively by arrows 604, 611, 610, and 608, result in no operation being performed. Transitions from "short holddown" state 601 to "no holddown" state 600 and from "short holddown" state 601 to "long holddown" state 602, represented respectively by arrows 605 and 607, result in the unblocking of waiting method invocations. Transitioning between states is controlled by the ORB daemon.

Figure 7A:
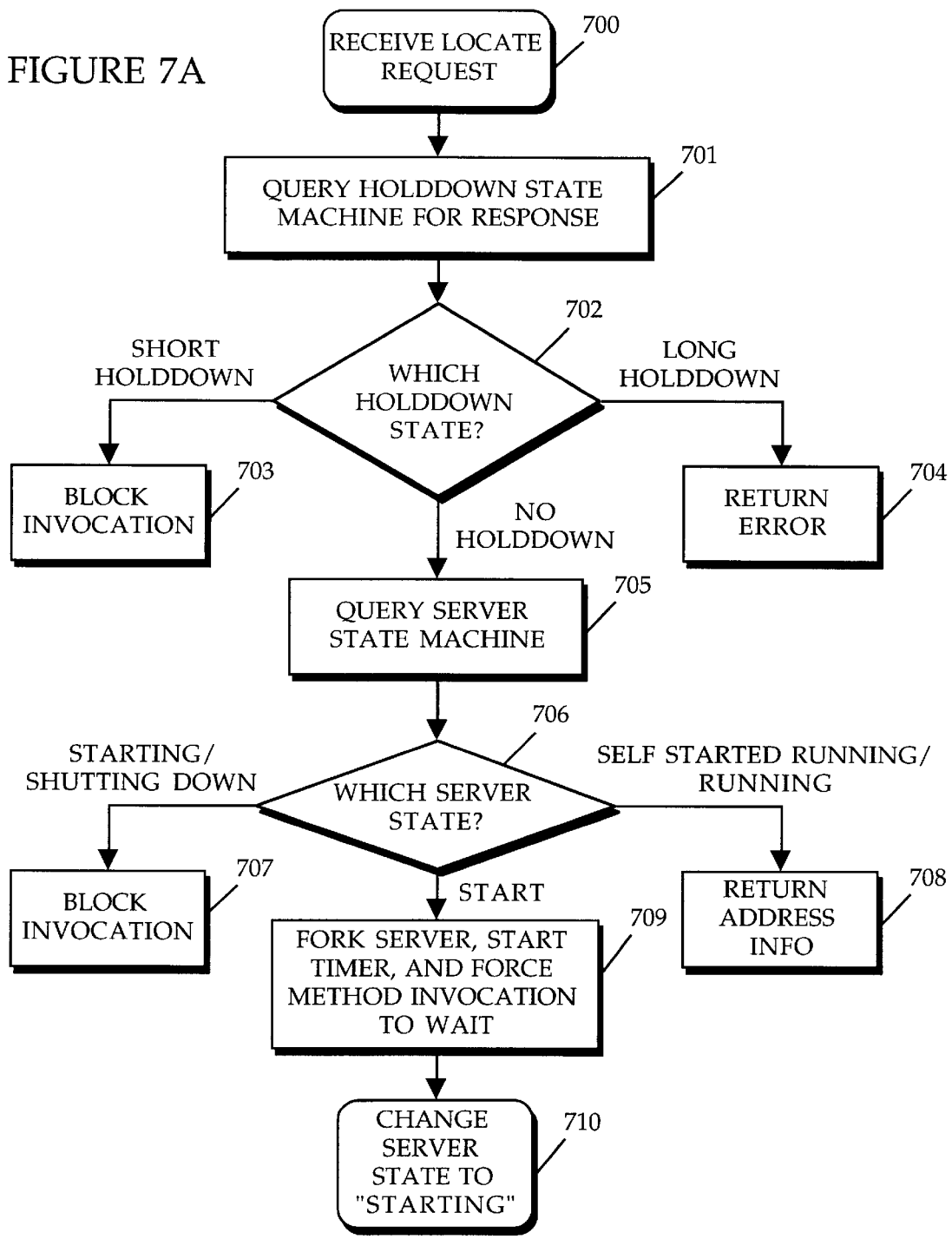
FIG. 7A shows one embodiment of a process for responding to a locate request.

FIG. 7A shows one embodiment of a process for responding to a locate request using the state machines previously described. In step 700, the state machine process receives a method invocation in the form of a locate request from a client thread. In step 701, the holddown state machine is queried to determine if a holddown condition affects the response to the locate request. A branching occurs at step 702 dependent on the current holddown state. If the holddown state is in "short holddown," then, in step 703, the invocation represented by the locate request is blocked. If the holddown state is in "long holddown," then, in step 704, the process returns an error to the client reflecting unavailability of the server. If the holddown state is in "no holddown," then, in step 705, the server state machine is queried to determine the current server state.

In step 706, a branching occurs dependent on the current server state. If the current server state is in "starting" or "shutting down," then, in step 707, the invocation is blocked. If the current server state is in "running" or "self started running," then, in step 708, server address information is returned to the client. If the current server state is "start," then, in step 709, the server process is forked off, the startup timer is started, and the method invocation from the client is made to wait. In step 710, the server state is changed to "starting."

Figure 7B:
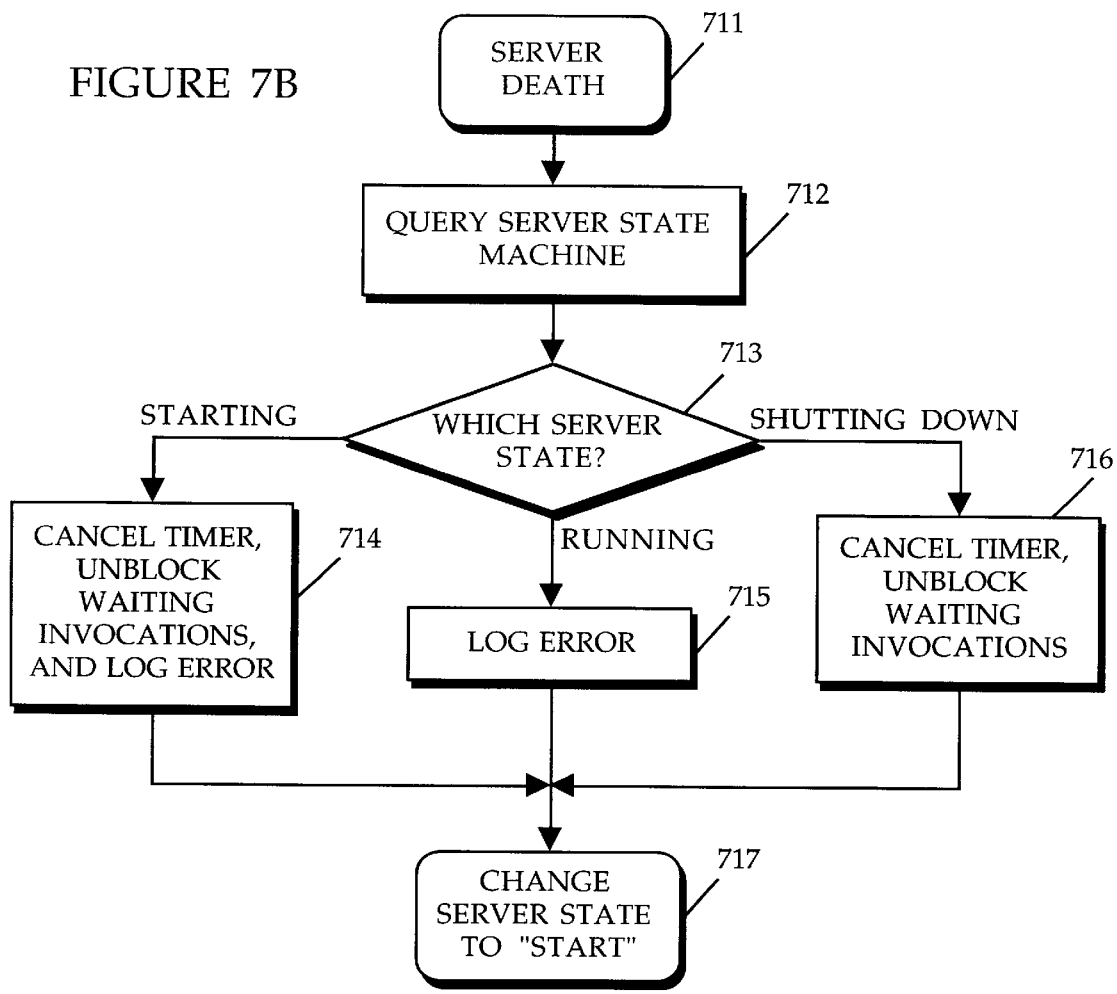
FIG. 7B illustrates one embodiment of a process for responding to a server termination notification.

FIG. 7B illustrates one embodiment of a process for responding to a server process termination notification using the server state machine previously described. In step 711, the process receives an indication that the server process has terminated. In step 712, the server state machine is queried to determine current server state information. A branching occurs in step 713 dependent on the current server state. If the current server state is in "starting," then, in step 714, the startup timer is cancelled, waiting method invocations are unblocked, and an error is logged. If the current server state is in "running," then, in step 715, an error is logged. If the current server state is in "shutting down," then, in step 716, the shutdown timer is cancelled and waiting method invocations are unblocked. Steps 714, 715 and 716 all proceed to step 717 wherein the server state is set to "start."

Figure 7C:
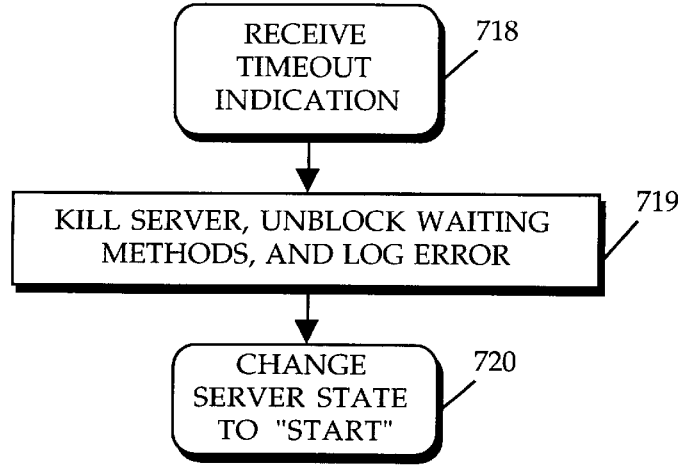
FIG. 7C illustrates one embodiment of a process for responding to a timeout.

FIG. 7C illustrates one embodiment of a process for responding to a timeout. In step 718, a timeout indication is received by the process. In step 719, the server process is killed, waiting method invocations are unblocked, and an error is logged. In step 720, the server state is set to "start."

Figure 7D:
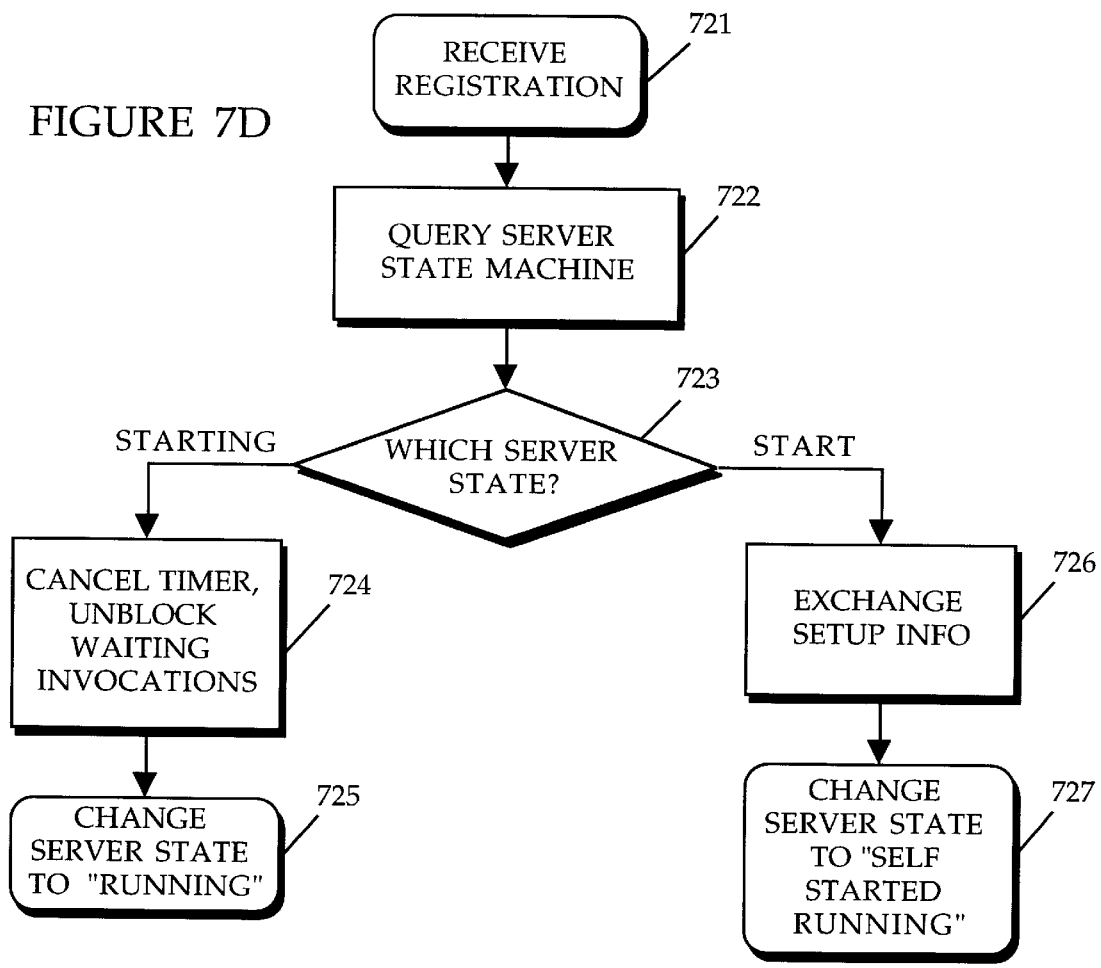
FIG. 7D illustrates one embodiment of a process for responding to a server registration.

FIG. 7D illustrates one embodiment of a process for responding to a server registration using the server state machine previously described. In step 721, the process receives a registration request from a server. In step 722, the server state machine is queried to obtain server state information. In step 723, a branching occurs dependent on the current server state. If the current server state is in "starting," then, in step 724, the startup timer is cancelled and waiting method invocations are unblocked. In step 725, the server state is set to "running." If the current server state is in "start," then, in step 726, setup information is exchanged between the server and the ORB daemon. In step 727, the server state is changed to "self started running."

Figure 7E:
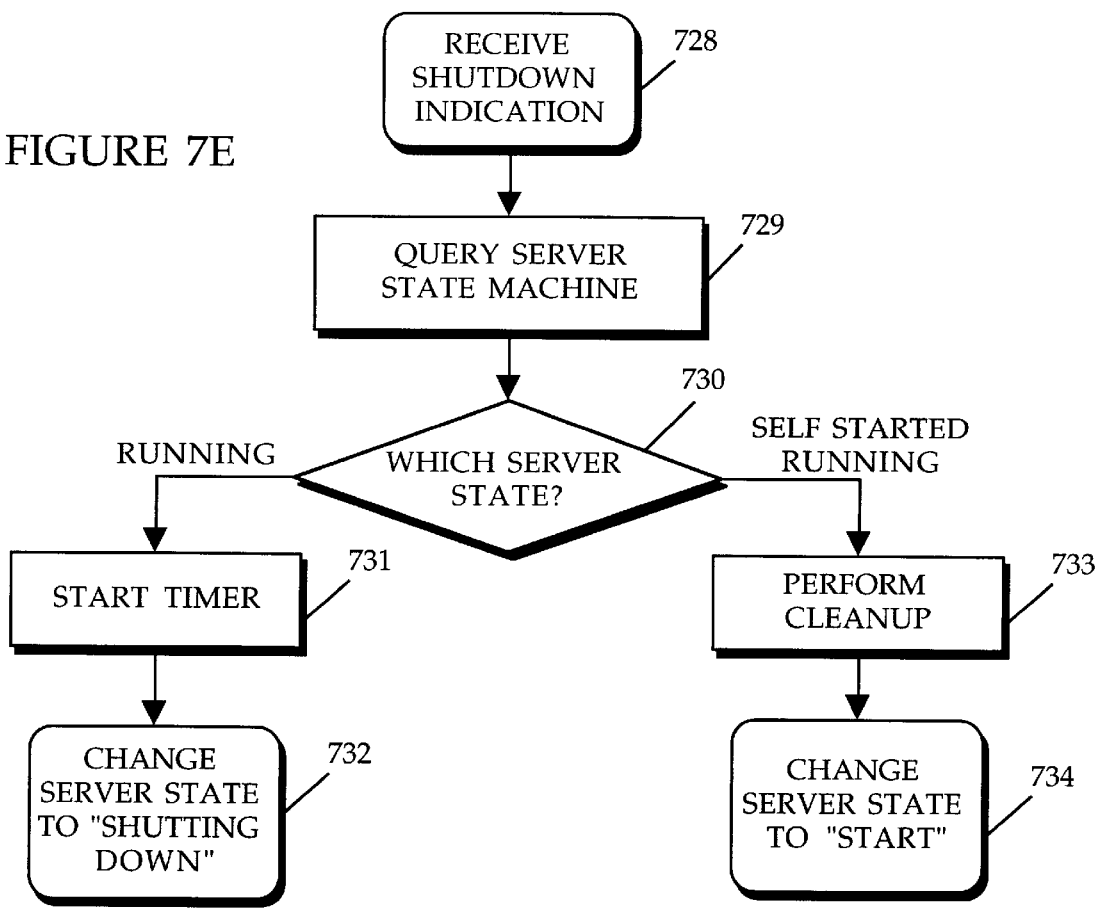
FIG. 7E illustrates one embodiment of a process for responding to a server shutdown indication.

FIG. 7E illustrates one embodiment of a process for responding to a server shutdown indication using the server state machine previously described. In step 728, a shutdown indication is received by the process. In step 729, the server state machine is queried for current server state information. A branching occurs in step 730 dependent on the current server state. If the current server state is in "running," then, in step 731, the shutdown timer is started. In step 732, the server state is set to "shutting down." If the current server state is in "self started running," then, in step 733, the ORB daemon performs cleanup of the server data structures. In step 734, the server state is set to "start."

Thus, a method and apparatus for controlling server activation has been described in conjunction with one or more specific embodiments. The invention is defined by the claims and their full scope of equivalents.

What is claimed is:

1. A method for controlling server activation comprising the steps of:

associating a server state in a server state machine with a first server;

changing a server state from a start state to a self started running state when a self started server registers;

changing said server state from a running state to a shutting down state when a shutdown indication is received from said server;

preventing startup of a second server while said first server is in said shutting down state; and changing said state from said shutting down state to said start state when said first server indicates completion of a shutdown process.

2. The method of claim 1 further comprising the step of blocking server invocations during said shutting down state.

3. The method of claim 1 further comprising the step of changing said server state from said self started running state to said start state when said self started server deregisters.

4. The method of claim 1 further comprising the step of starting a timer when said server state changes from said start state to a starting state.

5. The method of claim 4 further comprising the step of changing said state from said starting state to said start state if said timer expires.

6. The method of claim 5, wherein when said timer expires, said method further comprises the steps of:

terminating said first server; and logging an error.

7. The method of claim 5 further comprising the step of cancelling said timer when said first server registers.

8. The method of claim 1 further comprising the step of starting a timer when said server state changes from said running state to said shutting down state.

9. The method of claim 8 further comprising the step of changing said state from said shutting down state to said start state if said timer expires.

10. The method of claim 9, wherein when said timer expires, said method further comprises the steps of:

terminating said first server; and logging an error.

11. The method of claim 9 further comprising the step of cancelling said timer when said first server indicates completion of said shutdown process.

12. The method of claim 1 further comprising the steps of:

upon receipt of a locate request, querying a holddown state machine; and after querying said holddown state machine, querying said server state machine.

13. The method of claim 1 further comprising the step of returning server address information in response to a locate request when said server state is in said running state.

14. Apparatus for controlling a server comprising:

a central processing unit (CPU);

a control process being executed by said CPU, said control process comprising a server state machine having a start state, a starting state, a running state and a shutting down state;

said server state machine comprising a server state variable associated with a server, the contents of said server state variable representing a current server state, said server state machine receiving a plurality of inputs, said server state machine responding to said plurality of inputs and determining a next server state based on said current server state;

said state machine further comprising a first process configured to respond to method invocations, said first process comprising software code executed by said CPU, said software code comprising:

software code configured to block invocations when said current server state is said starting state or said shutting down state;

software code configured to fork off said server when said current server state is said start state;

software code configured to initiate a timer;
software code configured to return location information in response to a locate request when said current state is said running state; and
software code configured to change the contents of said server state variable to said starting state.

15. The apparatus of claim 14 wherein said control process further comprises a holddown state machine, and wherein said software code executed by said CPU further comprises software code configured to query said holddown state machine.

16. The apparatus of claim 14 wherein said state machine further comprises a self started running state, and wherein said software code configured to return location information is responsive during said self started running state.

17. Apparatus for controlling a server comprising:
a central processing unit (CPU);
a control process being executed by said CPU, said control process comprising a server state machine having a start state, a starting state, a running state and a shutting down state;
said server state machine comprising a server state variable associated with a server, the contents of said server state variable representing a current server state, said server state machine receiving a plurality of inputs, said server state machine responding to said plurality of inputs and determining a next server state based on said current server state;
said state machine further comprising a first process configured to respond to a server termination notification, said first process comprising software code executed by said CPU, said software code comprising:
software code configured to cancel a timer when said current server state is said starting state or said shutting down state;
software code configured to unblock waiting method invocations when said current server state is said starting state or said shutting down state;
software code configured to log an error when said current server state is said starting state or said running state; and
software code configured to change the contents of said server state variable to said start state.

18. Apparatus for controlling a server comprising:
a central processing unit (CPU);
a control process being executed by said CPU, said control process comprising a server state machine having a start state, a starting state, a running state and a shutting down state;
said server state machine comprising a server state variable associated with a server, the contents of said server state variable representing a current server state;
said server state machine receiving a plurality of inputs, said server state machine responding to said plurality of inputs and determining a next server state based on said current server state;
said state machine further comprising a first process configured to respond to a timeout, said first process comprising software code executed by said CPU, said software code comprising:
software code configured to terminate said server;
software code configured to unblock waiting method invocations;
software code configured to log an error; and
software code configured to change the contents of said server state variable to said start state.

19. Apparatus for controlling a server comprising:
a central processing unit (CPU);
a control process being executed by said CPU, said control process comprising a server state machine having a start state, a starting state, a running state and a shutting down state;
said server state machine comprising a server state variable associated with a server, the contents of said server state variable representing a current server state; and
said server state machine receiving a plurality of inputs, said server state machine responding to said plurality of inputs and determining a next server state based on said current server state;
said state machine further comprising a first process configured to respond to a server registration, said first process comprising software code executed by said CPU, said software code comprising:
software code configured to cancel a timer when said current server state is said starting state;
software code configured to unblock waiting method invocations when said current server state is said starting state; and
software code configured to change the contents of said server state variable to said running state when said current server state is said starting state.

20. The apparatus of claim 19 wherein said state machine further comprises a self started running state, and wherein said software code configured to change the contents of said server state variable changes the contents of said server state variable to said self started running state when said current server state is said start state, and wherein said software code executed by said CPU further comprises software code configured to exchange server setup information when said current server state is said start state.

21. Apparatus for controlling a server comprising:
a central processing unit (CPU);
a control process being executed by said CPU, said control process comprising a server state machine having a start state, a self started running state, a starting state, a running state and a shutting down state;
said server state machine comprising a server state variable associated with a server, the contents of said server state variable representing a current server state;
said server state machine receiving a plurality of inputs, said server state machine responding to said plurality of inputs and determining a next server state based on said current server state,
said state machine further comprising a first process configured to respond to a shutdown indication from said server, said first process comprising software code executed by said CPU, said software code comprising:
software code configured to initiate a timer; and
software code configured to clean up data structures when said current server state is said self started running state; and
software code configured to:
change the contents of said server state variable to said shutting down state when said current server state is said running state;
change the contents of said server state variable to said start state when said current server state is said self started running state.

22. A computer program product comprising:
a computer usable medium having computer readable program code embodied therein for controlling a server, said computer program product comprising:

computer readable program code configured to cause a computer to associate a server state with a server;

computer readable program code configured to cause a computer to change said server state from a running state to a shutting down state in response to shutdown indication from said server;

computer readable program code configured to cause a computer to change said server state from said shutting down state to a start state in response to a shutdown complete indication from said server;

computer readable program code configured to cause a computer to block invocations to said server during said shutting down state;

computer readable program code for causing a computer to change said server state from said start state to a self started running state in response to a registration from a self started server; and computer readable program code for causing a computer to return server address information in response to a locate request when said server state is said running state or said self started running state.

23. A computer program product comprising:

a computer usable medium having computer readable program code embodied therein for controlling a server, said computer program product comprising:

computer readable program code configured to cause a computer to associate a server state with a server;

computer readable program code configured to cause a computer to change said server state from a running state to a shutting down state in response to shutdown indication from said server;

computer readable program code configured to cause a computer to change said server state from said shutting down state to a start state in response to a shutdown complete indication from said server;

computer readable program code configured to cause a computer to block invocations to said server during said shutting down state;

computer readable program code for causing a computer to initiate a timer process in response to a locate request when said server state is said start state and in response to said shutdown indication; and computer readable program code for causing a computer to terminate said server and change said server state to said start state when said timer process expires.

24. The computer program code product of claim 23 further comprising computer readable program code for causing a computer to log an error when said timer process expires.

25. The computer program code product of claim 23 further comprising computer readable program code for causing a computer to unblock waiting method invocations when said timer process expires.

26. A computer program product comprising:

a computer usable medium having computer readable program code embodied therein for controlling a server, said computer program product comprising:

computer readable program code configured to cause a computer to associate a server state with a server;

computer readable program code configured to cause a computer to change said server state from a running state to a shutting down state in response to shutdown indication from said server;

computer readable program code configured to cause a computer to change said server state from said shutting down state to a start state in response to a shutdown complete indication from said server;

computer readable program code configured to cause a computer to block invocations to said server during said shutting down state;

computer readable program code for causing a computer to associate a holddown state with said server; and computer readable program code for determining a response to a locate request based on said holddown state.

27. A method for controlling server activation comprising the steps of:

associating a server state in a server state machine with a first server;

upon receipt of a locate request, querying a holddown state machine;

after querying said holddown state machine, querying said server state machine;

changing said server state from a running state to a shutting down state when a shutdown indication is received from said server;

preventing startup of a second server while said first server is in said shutting down state; and changing said state from said shutting down state to a start state when said first server indicates completion of a shutdown process.

28. The method of claim 27 further comprising the step of blocking server invocations during said shutting down state.

29. The method of claim 27 further comprising the step of changing said server state from said start state to a self started running state when a self started server registers.

30. The method of claim 29 further comprising the step of changing said server state from said self started running state to said start state when said self started server deregisters.

31. The method of claim 27 further comprising the step of starting a timer when said server state changes from said start state to a starting state.

32. The method of claim 31 further comprising the step of changing said state from said starting state to said start state if said timer expires.

33. The method of claim 32, wherein when said timer expires, said method further comprises the steps of:

terminating said first server; and logging an error.

34. The method of claim 32 further comprising the step of cancelling said timer when said first server registers.

35. The method of claim 27 further comprising the step of starting a timer when said server state changes from said running state to said shutting down state.

36. The method of claim 35 further comprising the step of changing said state from said shutting down state to said start state if said timer expires.

37. The method of claim 36, wherein when said timer expires, said method further comprises the steps of:

terminating said first server; and logging an error.

38. The method of claim 36 further comprising the step of cancelling said timer when said first server indicates completion of said shutdown process.

39. The method of claim 27 further comprising the step of returning server address information in response to a locate request when said server state is in said running state.

* * * * *